United States Patent [19]

Sekiguchi et al.

[11] 4,231,116
[45] Oct. 28, 1980

[54] RADIO STATION SYSTEM

[75] Inventors: Nobuo Sekiguchi, Kodaira; Yukinari Fujiwara, Musashimurayama; Mitsuo Toya, Fujisawa; Yoichi Kaneko, Tokorozawa, all of Japan

[73] Assignees: Hitachi, Ltd.; Hitachi Denshi Kabushiki Kaisha, both of Tokyo, Japan

[21] Appl. No.: 963,431

[22] Filed: Nov. 24, 1978

[30] Foreign Application Priority Data

Mar. 27, 1978 [JP] Japan .................................. 53-35122

[51] Int. Cl.$^3$ ............................................. H04B 1/50
[52] U.S. Cl. .................................... 455/87; 370/30;
 455/118; 455/119; 455/260; 455/333
[58] Field of Search ............................ 325/17, 18, 20;
 343/179, 181; 331/1 A, 58; 363/1, 157

[56] References Cited

U.S. PATENT DOCUMENTS

| | | | |
|---|---|---|---|
| 2,757,279 | 7/1956 | Vosburgh | 325/17 |
| 3,324,396 | 6/1967 | Schneider | 343/181 |
| 4,009,451 | 2/1977 | Moore et al. | 325/20 |

Primary Examiner—Benedict V. Safourek
Attorney, Agent, or Firm—Charles E. Pfund

[57] ABSTRACT

In a radio station system utilizing multi-channel transmission and reception frequencies of the type comprising a transmitter and a receiver wherein the frequency difference between the transmission and reception frequencies is made to be equal to an intermediate frequency, there is provided a source of multi-frequency signal which determines the multi-channel transmission and reception frequencies. The output of the multi-frequency signal source is utilized directly as a local oscillation signal of the receiver and the frequency of the output of the multi-frequency signal source is shifted by a modulated wave having a frequency twice the intermediate frequency and the frequency shifted output is utilized as the transmission frequency.

3 Claims, 7 Drawing Figures

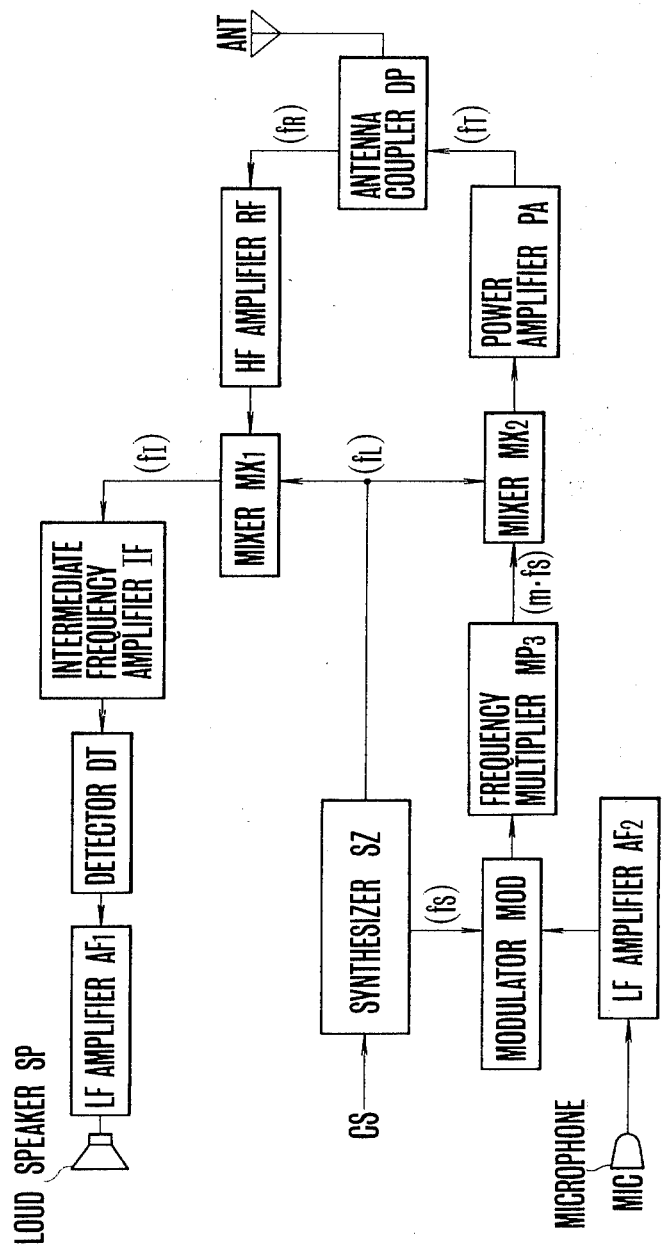
F I G. 3

RADIO STATION SYSTEM

BACKGROUND OF THE INVENTION

This invention relates to a radio station system, and more particularly to a mobile radio station system having a transmitter and a receiver.

With recent increase in the use of mobile communication systems, for the purpose of simplifying the construction of the mobile radio station system mounted on a vehicle and ensuring the duplex transmission i.e., simultaneous transmission and reception, wave channels are allocated such that the difference between the transmission frequency and the reception frequency of the mobile station is made constant and a plurality of transmission and reception channels are so set as to maintain this relationship.

For this reason, the mobile radio station system is designed to use a single source of multi-frequency signals and when the output of this source is multiplied by a desired number n (being an integer), it is possible to obtain a local oscillation signal of the receiver and a transmission frequency of the transmitter. With this arrangement, it is not necessary to provide a plurality of crystal oscillators for controlling the transmission and reception frequencies. Accordingly, the construction of the mobile radio station system becomes more simple than that of a common transmission and reception system.

FIG. 1 shows the transmission and reception channel allocation in the radio station system of this type. One of channels $ch_1, ch_2, ch_3, \ldots ch_n$ is designated by a channel designating input. Letting transmission frequencies associated with the channels $ch_1, ch_2, ch_3, \ldots ch_n$ be $f_{T1}, f_{T2}, f_{T3}, \ldots f_{Tn}$, respectively, and reception frequencies associated with the respective channels be $f_{R1}, f_{R2}, f_{R3}, \ldots f_{Rn}$, the relation:

$$f_{T1} - f_{R1} = f_{T2} - f_{R2} = f_{T3} - f_{R3} = \ldots = f_{Tn} - f_{Rn} = f_I$$

stands. This constant frequency difference $f_I$ stands for the intermddiate frequency to be described later. Of course, the approximate relation $$f_{T1} \sim f_{R1} = f_{T2} \sim f_{R2} = \ldots = f_{Tn} \sim f_{Rn} = f_I$$

generally stands.

FIG. 2 is a block diagram showing the construction of a prior art radio station system constructed such that the output frequency f of a source of multi-frequency signal MFG utilizing a synthesizer for determining transmission and reception frequencies (the output frequency f is determined by a channel designating input CS) is multiplied by the desired number n by a multiplier $MP_1$ located on the receiving side, that the output n·f of the multiplier $MP_1$ is applied to a mixer MX as a local oscillation signal for deriving out the difference between it and the reception frequency $f_R$ to produce an intermediate frequency signal $f_I$ which in turn is amplified by an intermediate frequency amplifier IF and then detected and demodulated by a detector DT, and that the output of the detector DT is amplified to a desired power level by a low frequency amplifier $AF_1$ and then applied to a loudspeaker SP.

The output of the source of the multi-frequency signal MFG is also applied to a modulator MOD to act as a carrier wave which is modulated by the output of a microphone MIC which is amplified by a low frequency amplifier $AF_2$. The frequency of the modulated wave is multipled by the desired number n by a frequency multiplier $MP_2$ to produce a transmission signal having a frequency $f_T$. The transmission signal is amplified by a power amplifier PA and then sent to an antenna ANT through an antenna coupler DP.

A wave dividing circuit or the like may be used as the antenna coupler DP so as to pass to the antenna ANT only the transmission signal and to pass the signal received by the antenna ANT only to a high frequency amplifier RF. After being amplified by the high frequency amplifier RF, the received signal is applied to the mixer MX and then demodulated to form a reception output as described above.

Since the difference between the transmission frequency $f_T$ (being n·f) and the reception frequency $f_R$ is equal to the intermediate frequency $f_I$, the following relationships hold.

$$f_I = f_R - f_T \tag{1}$$

$$f_T = n \cdot f \tag{2}$$

where f represents the output frequency of the source of the multi-frequency signal MFG. From equations (1) and (2)

$$f_I = f_R - n \cdot f \tag{3}$$

As can be noted from equations (2) and (3), since the factor n of multiplication is constant, where the channels of the signals of the transmission frequency $f_T$ and the reception frequency $f_R$ are desired to be changed, the output frequency of the multi-frequency signal source MFG should also be changed. This requires to broaden the frequency band of the circuit, starting from the carrier wave input to the modulator MOD to the output of the modulated wave, in accordance with the channel utilized. At the same time, frequency multipliers $MP_1$ and $MP_2$ are required to have broad band characteristics corresponding to the channel used. Since it is impossible to make the high frequency tuning characteristics of the frequency multipliers correspond to a single peak tuning characteristic which is commensurate with only a single frequency, not only the gain is decreased requiring increased number of stages but also the circuit construction becomes complicated which increases the time for adjusting.

SUMMARY OF THE INVENTION

It is an object of this invention to provide an improved radio station system in which the modulator and the frequency multiplier are not required to have wide band characteristics and the construction of the radio station system can be greatly simplified.

According to this invention, there is provided a radio station system utilizing multi-channel transmission and reception frequencies of the type comprising a transmitter and a receiver wherein the frequency difference between the transmission frequency and the reception frequency is made to be equal to an intermediate frequency, characterized by a source of multi-frequency signal which determines the multi-channel transmission and reception frequencies, means for directly utilizing the output of the multi-frequency signal source as a local oscillation signal of the receiver, and means for shifting the frequency of the output of the multi-frequency signal source by a modulated wave having a frequency twice the intermediate frequency and utilizing the frequency shifted output as the transmission frequency.

BRIEF DESCRIPTION OF THE DRAWINGS

Further objects and advantages of the invention can be more fully understood from the following detailed description taken in conjunction with the accompanying drawings in which:

FIG. 3 is a block diagram showing one embodiment of this invention;

DESCRIPTION OF THE PREFERRED EMBODIMENT

In a preferred embodiment of this invention shown in FIG. 3, the output of a synthesizer SZ having a frequency $f_L$ and acting as a source of a multi-frequency signal is applied directly to a mixer $MX_1$ on the receiver side so as to directly use the output of the synthesizer SZ as a local oscillation signal.

The synthesizer SZ also produces an output having a frequency of $f_S$ which is applied to a modulator MOD to act as a carrier wave which is modulated with the output of a low frequency amplifier $AF_2$ which amplifies the output of a microphone MIC to form a modulated wave. The frequency of the modulated wave is multiplied by a frequency multiplier $MP_3$ up to a frequency $m \cdot f_S$ which is equal to twice the intermediate frequency $f_I$. The reason why the frequency $m \cdot f_S$ is made equal to twice the $f_I$ will be explained later. The output of the frequency multiplier $MP_3$ is applied to one input of mixer $MX_2$ to effect frequency shift. The output of the synthesizer SZ having the frequency of $f_L$ is applied to the other input of the mixer $MX_2$ so that the mixer produces a frequency difference between the outputs of the synthesizer SZ and the frequency multiplier $MP_3$. As a result, the frequency of the output of the synthesizer SZ is shifted to low frequency side by an amount twice the intermediate frequency $f_I$. The shifted frequency is used as the transmission frequency which is amplified by a power amplifier PA and then sent to an antenna ANT through an antenna coupler DP in the same manner as in FIG. 2.

Figure 2:
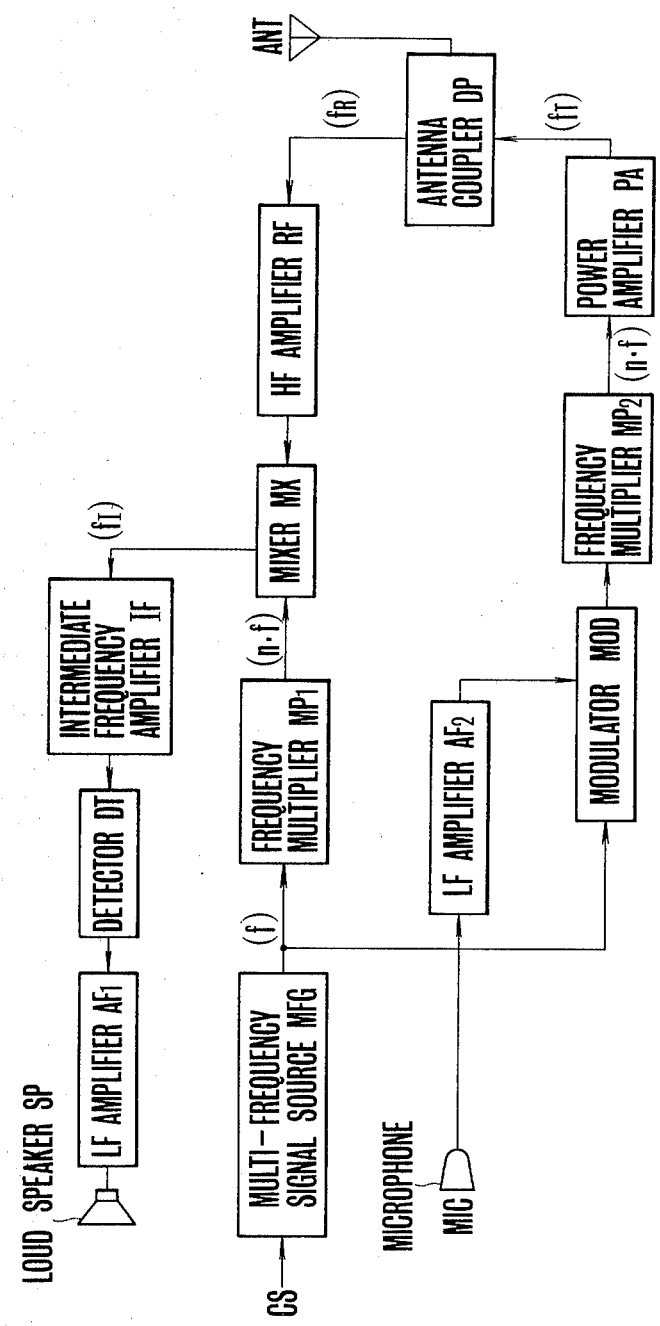
FIG. 2 is a block diagram showing one example of a prior art radio station system.

In the same manner as in FIG. 2, the received frequency signal from the antenna ANT is amplified by a high frequency amplifier RF, and the frequency difference between the frequency of the output of the high frequency amplifier RF and the frequency of the output of the synthesizer SZ is taken out by mixer $MX_1$ as the intermediate frequency $f_I$ which is applied to a loudspeaker SP via an intermediate frequency amplifier IF, a detector DT and a low frequency amplifier $AF_1$.

The output frequency $f_L$ of the synthesizer SZ varies in accordance with a channel designation input CS supplied to the synthesizer SZ, thereby producing a variable frequency output. On the other hand, the frequency $f_S$ of the other output does not vary, thus producing a fixed frequency output.

The relationships among various frequencies are as follows.

$$f_T = f_L - m \cdot f_S \tag{4}$$

$$f_I = f_L - f_R \tag{5}$$

The relationship of equation (1), $f_I = f_R - f_T$, also holds. Accordingly, by modifying equations (1) and (5), we obtain $$f_T = f_R - f_I \tag{6}$$

$$f_L = f_I + f_R \tag{7}$$

In order to determine a value of m which satisfies equations (6) and (7), these equations (6) and (7) are substituted in equation (4), and we obtain $$m \cdot f_S = 2 f_I \tag{8}$$

So long as the relationship between the fixed frequency output $f_S$ of the synthesizer SZ and the multiplying factor m of the frequency multiplier $MP_3$ satisfies equation (8), the relationship of equation (1) always holds even when the channel designation is changed by changing the channel designating input CS to change the variable frequency output $f_L$ of the synthesizer SZ, thereby accomplishing the intended object of the present invention.

For this reason, it is sufficient for the modulator MOD and the multiplier $MP_3$ to have a frequency characteristic commensurate with the definite frequency $f_S$ and they are not required to have wide band frequency characteristics. Accordingly, it is possible to not only simplify the circuit construction, but also to adjust it readily. Although an additional mixer $MX_2$ is necessary, the frequency multiplier $MP_1$ shown in FIG. 2 can be dispensed with. Usually, the frequency multiplier $MP_1$ has a multi-stage construction but as will be described later, the mixer $MX_2$ may be of a single stage construction just like mixer $MX_1$, so that the construction of the radio station system as a whole is simplified.

Figure 4:
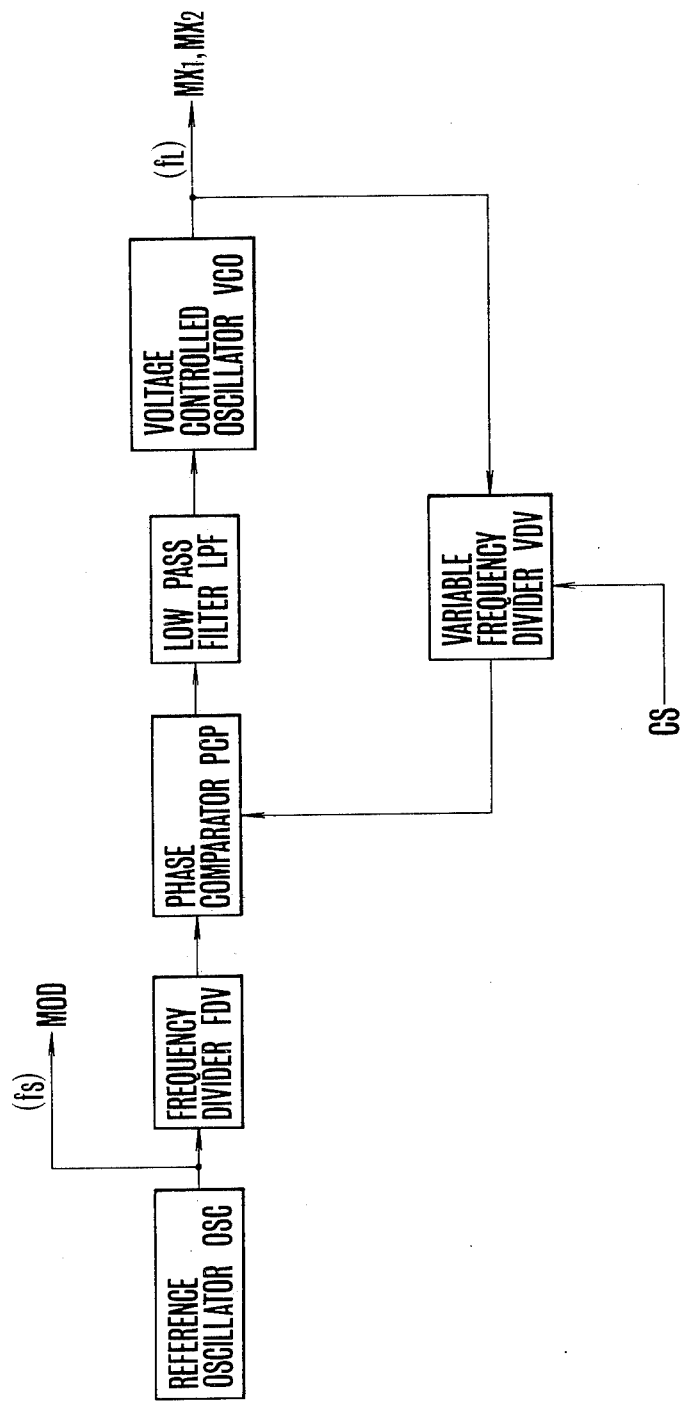
FIG. 4 is a block diagram showing the synthesizer utilized in the embodiment shown in FIG. 3.

FIG. 4 shows the detail of the synthesizer SZ utilized in the embodiment shown in FIG. 3 and comprising a reference oscillator OSC having a stable oscillation frequency such as a crystal oscillator, or the like. The frequency of the reference oscillator OSC is divided by a frequency divider FDV and the output thereof is applied to one input of a phase comparator PCP having the other input connected to a voltage controlled oscillator VCO through a variable frequency divider VDV so as to compare the phases of two inputs. The output of the phase comparator PCP is applied to the voltage controlled oscillator VCO through a damping low pass filter LPF to act as the control voltage of the voltage controlled oscillator, thus controlling the oscillation frequency thereof. The frequency of the output of the voltage controlled oscillator VCO is divided by the variable frequency divider VDV utilizing a programmable counter or the like and then applied to the phase comparator PCP for constituting an automatic phase control (AFC) loop, thus determining the oscillation frequency of the voltage controlled oscillator VCO when the frequencies and phases of the outputs of the frequency divider FDV and of the variable frequency divider VDV coincide with each other.

Accordingly, when the number of frequency divisions of the variable frequency divider VDV is varied by using the channel designation signal CS supplied to the variable frequency divider, the oscillation frequency of the voltage controlled oscillator VCO is also varied correspondingly, thus sending out a variable frequency output $f_L$ having a given frequency in synchronism with the output of the reference oscillator OSC. Since the oscillation frequency of this oscillator is constant and always has a definite relationship with the variable frequency output $f_L$, it is possible to use this oscillation frequency as a carrier wave having a fixed frequency $f_S$ supplied to the modulator MOD.

For example, assuming a transmission frequency $f_T$ of 440–450 MHz, a receiving frequency of 450–470 MHz and an intermediate frequency $f_I$ of 10 MHz, from equation (7) the variable output frequency $f_L$ is calculated to be 460–480 MHz. In this case, when the fixed output frequency $f_S$ is selected to be 4 MHz according to the relationship of equation (8), the oscillation frequency of the reference oscillator OSC is also 4 MHz. Denoting the frequency spacing between the transmission and reception channels by 25 KHz, it is necessary to determine the frequency division ratio of the variable frequency divider VDV in accordance with the ratio between the variable output frequency and 25 KHz. Accordingly, it is suitable to select the output frequency of the variable frequency divider VDV to be 25 KHz and hence the output frequency of the frequency divider FDV is also determined to be 25 KHz. Consequently, the ratio of frequency division of the frequency divider FDV should be 160 and that of the variable frequency divider VDV should be $184 \times 10^4$–$192 \times 10^4$. However, as the ratio of frequency division of the variable frequency divider VDV is high, it is necessary to use such a high response speed circuit as an emitter coupled logic (ECL). In some cases, a down-converter may be interposed between the output of the voltage controlled oscilllator VCO and the input of the variable frequency divider for the purpose of decreasing the ratio of frequency division.

Figure 1:
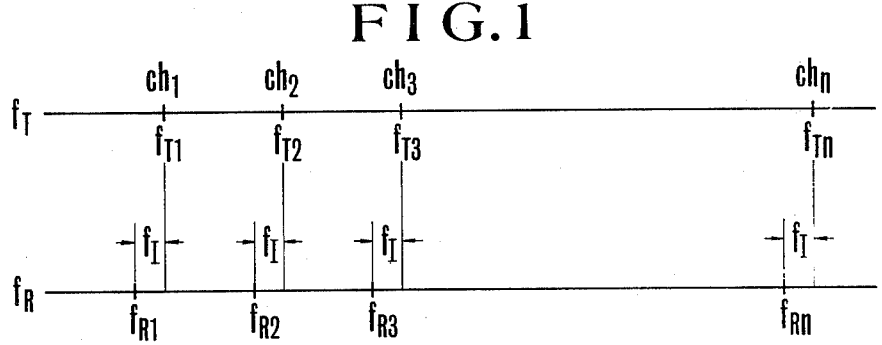
FIG. 1 is a diagramatic representation to explain the allocation of channels in a radio station system to which the invention is applied.
Figure 5:
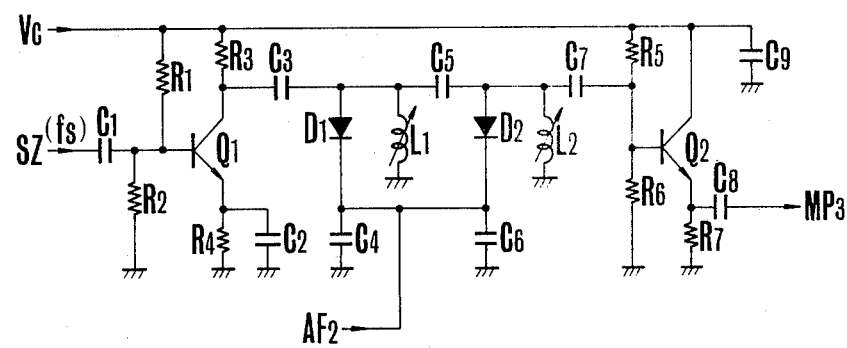
FIG. 5 is a connection diagram showing the modulator shown in FIG. 3.

FIG. 5 shows one example of the detail of the modulator MOD. Since the modulator utilizes a well known phase modulator disclosed in Japanese utility model publication No. 3703/1951, its detail will not be described herein but it operates as follows:

More particularly, the fixed output frequency $f_S$ of the synthesizer SZ is applied to an amplifier stage comprising a transistor $Q_1$, resistors $R_1$ through $R_4$ and a capacitor $C_2$ via capacitor $C_1$ to act as a carrier wave. The amplified output derived out through the collector electrode of the transistor $Q_1$ is coupled to two tuning circuits constituted by variable capacitance diodes $D_1$ and $D_2$, and coils $L_1$ and $L_2$, through a capacitor $C_3$ to vary the phase of the carrier wave by the capacitance variation of the variable capacitance diodes $D_1$ and $D_2$ which is caused by the variation of the level of the modulating input from a low frequency amplifier $AF_2$. The phase modulated wave is applied to the base electrode of a transistor $Q_2$ through a capacitor $C_7$, the transistor $Q_2$ constituting an emitter follower circuit together with resistors $R_5$, $R_6$ and $R_7$ so as to obtain a modulated wave output from the emitter electrode of transistor $Q_2$ via a capacitor $C_8$.

Capacitors $C_4$ and $C_6$ manifest a low impedance against the carrier wave frequency but a high impedance against the modulating input frequency so as to bypass the carrier wave whereas capacitor $C_5$ couples together a first tuning circuit comprising the variable capacitance diode $D_1$ and coil $L_1$ and a second tuning circuit comprising the variable capacitance diode $D_2$ and coil $L_2$. Coils $L_1$ and $L_2$ take the form of variable inductances which enable to adjust the tuning frequencies. Transistor $Q_2$ serves to convert a high input impedance to a low output impedance so as to prevent the effect of the load impedance upon the characteristics of the tuning circuits. The collector electrodes of transistors $Q_1$ and $Q_2$ are energized from a source $V_C$ and a bypass capacitor $C_9$ is connected in parallel with the source.

Figure 6:
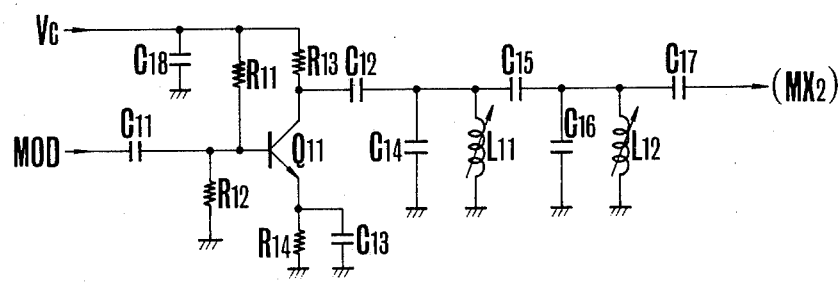
FIG. 6 is a connection diagram showing the frequency multiplier shown in FIG. 3.

FIG. 6 shows one example of the frequency multiplier $MP_3$, and a plurality of stages of a number corresponding to the frequency multiplication are connected in cascade. A transistor $Q_{11}$ constitutes a nonlinear amplifier stage together with resistors $R_{11}$ through $R_{14}$ and a capacitor $C_{13}$ for amplifying the modulated wave from the modulator MOD. Due to its nonlinearlity, the nonlinear amplifier generates higher harmonic components, and among the higher harmonic components derived from the collector electrode of transistor $Q_{11}$ via a capacitor $C_{12}$, only the higher harmonic components of the desired orders are derived from the twin tuning circuits constituted by capacitors $C_{14}$, $C_{16}$ and coils $L_{11}$, $L_{12}$ and then applied to the input of the succeeding stage or mixer $MX_2$ via capacitor $C_{17}$.

Similar to FIG. 5 coils $L_{11}$ and $L_{12}$ take the form of variable inductance so as to determine the tuning frequencies of both tuning circuits. This provides a single peak tuning characteristic in conjunction with the coupling function of the two tuning circuits afforded by a capacitance $C_{15}$.

Figure 7:
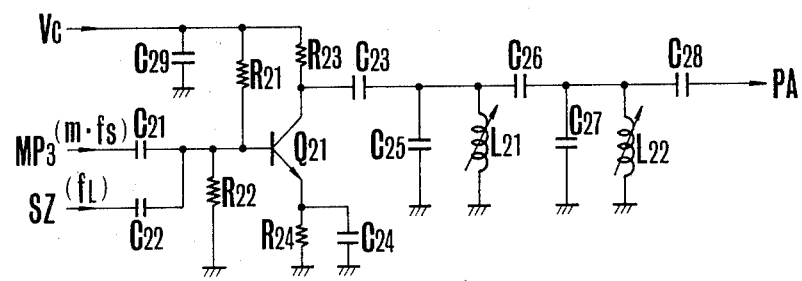
FIG. 7 is a connection diagram showing the mixer shown in FIG. 3.

FIG. 7 shows the detail of the mixer $MX_2$ having generally the same circuit construction as that shown in FIG. 6. However, a signal having a multiplied frequency $m \cdot f_S$ supplied by the frequency multiplier $MP_3$ and a signal having a variable output frequency $f_L$ generated by the synthesizer SZ are applied to the base electrode of a transistor $Q_{21}$ through capacitors $C_{21}$ and $C_{22}$, respectively, and due to the nonlinear characteristic of transistor $Q_{21}$, a difference frequency component corresponding to the difference between the two input frequencies is formed and applied to twin tuning circuits constituted by capacitors $C_{25}$, $C_{27}$ and coils $L_{21}$, $L_{22}$ via a capacitor $C_{23}$. In cooperation with a capacitor $C_{26}$, the twin tuning circuits manifest a single peak tuning characteristic, and the tuning frequency thereof is matched with the transmission frequency by adjusting coils $L_{21}$ and $L_{22}$. Among various frequency components only the component which matches with the transmission frequency is extracted and supplied to the power amplifier PA.

In the circuit shown in FIG. 6, when the tuning frequency is selected to be equal to the intermediate frequency $f_I$, this circuit can also be used as the mixer $MX_1$. The connection of the source $V_c$ in FIGS. 6 and 7 is similar to that shown in FIG. 5.

It should be understood that the circuits shown in FIGS. 4 through 7 can be modified variously according to design conditions. In the circuit shown in FIG. 3, too, various auxiliary circuits may be inserted between successive stages and various circuits can be added. Although in the foregoing embodiment a phase modulation circuit was used, other types of modulation circuit can also be used. Furthermore, the application of this invention is not limited to the duplex transmission system but the invention is also applicable to any radio station system of the press-to-talk communication type so long as there is a similar frequency relationship.

As described above, according to this invention, it is possible not only to decrease the band width of the high frequency band characteristics of the modulator and of the frequency multiplier, but also to simplify the circuit construction, thus achieving easy adjustment, decrease in the cost and miniaturization. Due to the decrease in the band width, stability and reliability of the operation are improved. Thus the invention can advantageously be applied to mobile station and many other types of the raido station systems.

What is claimed is:

1. In a radio station system for transmission and reception of signals from a modulation signal source utilizing multichannel transmission and reception frequencies of the type comprising a transmitter and receiver wherein a multi-frequency signal source is supplied with a channel designation input to produce the local reference frequency signal for the receiver and the transmission frequency signal for the transmitter and wherein the difference between the transmission and reception frequencies is made equal to the intermediate frequency with respect to respective channels, the improvement which comprises means for directly utilizing a variable frequency output of said multifrequency signal source and said local reference frequency signal, said variable output being responsive to said channel designation input to select channel frequencies, means for producing a fixed frequency output from said multi-frequency signal source, means responsive to said fixed frequency and said modulation signal for producing a modulated carrier wave having a frequency twice said intermediate frequency, means for shifting the frequency of said variable output by the frequency of said carrier wave, and means for utilizing said freuqency shifted output to determine said transmission frequency.

2. The radio station system according to claim 1 wherein said multi-frequency signal source comprises a synthesizer which supplies the output of a reference oscillator as the carrier wave of said modulated wave.

3. The radio station system according to claim 1 wherein said modulated wave producing means comprises a modulator for modulating the fixed frequency output of said multi-frequency signal source with the modulation signal source output and a frequency multiplier connected to receive the output of said modulator to produce said carrier wave.

* * * * *